April 13, 1965 G. F. CAMP 3,177,894
CONTROLLED ACTION CHECK VALVE
Filed Feb. 28, 1962

INVENTOR.
GEORGE F. CAMP
BY
*Head & Johnson*
ATTORNEYS

United States Patent Office 3,177,894
Patented Apr. 13, 1965

3,177,894
CONTROLLED ACTION CHECK VALVE
George F. Camp, Tulsa, Okla., assignor to Frank Wheatley Pump & Valve Manufacturer, Tulsa, Okla., a corporation of Oklahoma
Filed Feb. 28, 1962, Ser. No. 176,230
2 Claims. (Cl. 137—514)

This invention relates to a check valve. More particularly, the invention relates to a controlled action check valve. Still more particularly, the invention relates to a controlled action check valve having means for controlling the rate of opening and closing the check valve clapper.

Check valves are commonly used in pipeline installations and in all types of pumping installations to permit the flow of gases and liquids in one direction in a line but to prevent flow in the opposite direction. One of the most frequently used types of check valves is the clapper type having a pivoted clapper which pivots to closed position when the direction of fluid flow is in one direction and pivots to an open position when the fluid flow is in the opposite direction. In many industrial applications, particularly the transmission of gas, the rapid closing of a check valve can cause serious damage to the pipeline, connecting manifolds and to the check valve itself. When sudden pressure changes occur in a gas line wherein the gas is being pumped under a substantial pressure, the expansion characteristics of the gas can force a check valve to slam shut with such force as to damage the valve, and in addition, the immediate shutting of the check valve sets up tremendous pressure waves in the gas column which can result in the rupture of lines and other equipment.

For these and other reasons, it is important to provide a means of controlling the rate of opening and particularly the rate of closing of check valves.

It is therefore an object of this invention to provide a mechanism in conjunction with a check valve to control the opening and closing of the valve.

Another object of this invention is to provide a controlled action check valve of the pivoted clapper type wherein the rate of opening and closing of the clapper of the valve is controlled.

Another object of this invention is to provide a controlled action check valve including hydraulic means of controlling the rate of opening and closing of the valve and including means whereby the rate of opening and the rate of closing may be individually controlled.

Another object of this invention is to provide a controlled action check valve including a hydraulic mechanism in conjunction with the check valve and including means of balancing the pressure exerted by the hydraulic mechanism.

Another object of this invention is to provide a controlled action check valve including means of utilizing pressure within the valve to equalize the pressure on the closing mechanism.

Another object of this invention is to provide a controlled action check valve which is simple to manufacture, inexpensive to assemble and produce, and substantially fail proof in its operation.

These and other objects and a better understanding of the invention may be had by referring to the following description and claims taken in conjunction with the attached drawings in which:

Figure 1:
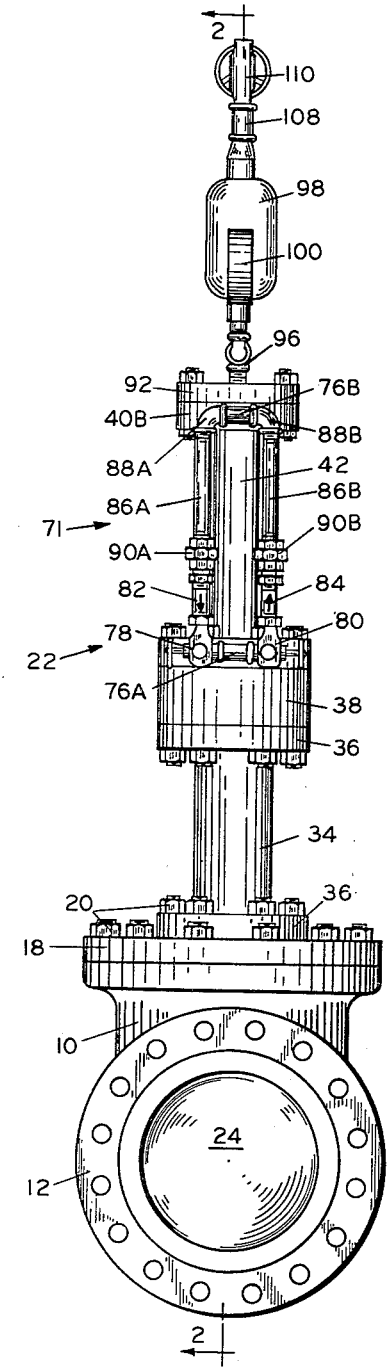
FIGURE 1 is a plan view of a controlled action check valve of this invention, the plan view being taken at one end of the valve in direction of fluid flow through the valve.

Referring now to the drawings and first to FIGURE 1, a clapper-type check valve is indicated generally by the numeral 10. The valve 10 is provided with a flange 12 by which the valve is connected to piping or other mechanisms as it is used.

Supported to cover 18 of valve 10, which is held in place by studs and nuts 20, is the hydraulic control mechanism of this invention indicated generally by the numeral 22.

Figure 2:
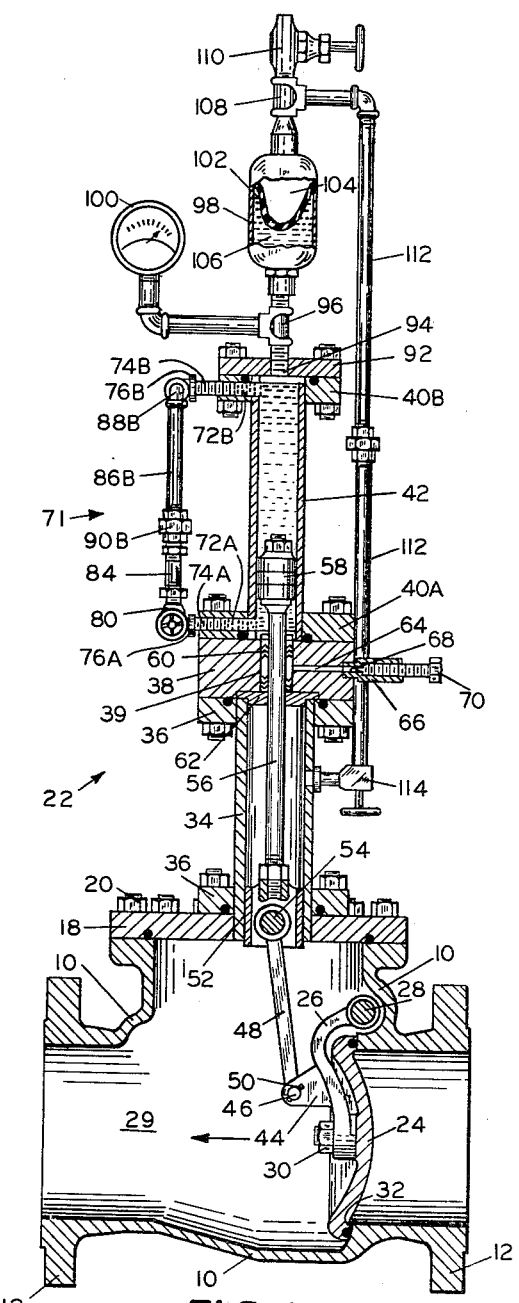
FIGURE 2 is a cut away view of the controlled action check valve taken primarily as a cross-sectional view along the line 2—2 of FIGURE 1.

Referring to FIGURE 2, the internal arrangement of the valve 10 and the hydraulic control mechanism 22 is best shown. Check valve 10 is a typical swing or clapper type check valve having a clapper 24 supported by an arm 26 which is pivoted to valve body 10 by arm pin 28. A fluid port 29 extends through the valve. Clapper 24 is supported to arm 26 by clapper nut 30. Flow through the valve occurs in the direction of the arrow so that when pressure of fluid in the valve to the right of clapper 24 is greater than the pressure to the left of the clapper, the clapper swings or pivots about pivot pin 28 to allow fluid to pass through the valve. When the pressure to the left of the clapper 24 is greater than that to the right, then the valve clapper 24 pivots closed to seat and seal against valve face 32. Without some restraint on the pivotal movement of clapper 24, sudden pressure changes can move the clapper 24 very violently in one direction or the other. This is particularly true when pressure to the left of the clapper suddenly becomes much greater than that to the right of the clapper so that the clapper 24 slams shut. In a small valve the rapid closing may be tolerated, but in valves of two inches or greater, and particularly larger sized valves of eight inches and up, the sudden slamming shut of the valves, as frequently occurs in gas lines, shocks not only the valve itself but connecting manifolds and pipings. The sudden closing causes vibrations which tend to loosen connections, break down welds and reduce the valve life. To control the opening and closing of clapper 24, a unique hydraulic control arrangement 22 has been provided and which will now be described.

Affixed to cover 18 is a crosshead cylinder 34. Crosshead cylinder flanges 36 may be provided as a portion of the crosshead cylinder 34 by which it is supported to cover 18 or, especially in smaller valve sizes, crosshead cylinder 34 may be welded directly to cover 18.

Supported at the top end of a crosshead cylinder 34 is a stuffing box 38 having an opening 39 therein and supported by flange 40 to stuffing box 38 is a piston cylinder 42. Crosshead cylinder 34 is positioned coaxially with piston cylinder 42 and with opening 39 in stuffing box 38.

Integrally formed with arm 26 which supports the clapper 24 is a connecting rod support 44 to which is pivotally connected, by pin 46, a connecting rod 48. Pin 46 is held in position by a cotter pin 50. Slideably positioned in crosshead cylinder 34 is a crosshead 52. Connecting rod 48 is pivotally connected to crosshead 52 by wrist pin 54.

Extending from crosshead 52 through opening 39 in stuffing box 38 is a piston rod 56. Slideably positioned within piston cylinder 42 and connected to the upper end of piston rod 56 is a piston 58.

Stuffing box packing 60 is positioned within stuffing box opening 39 around piston rod 56 and is held in position by packing retainer 62. Stuffing box packing 60 may be of any type of the well known and commonly used packing materials, but the preferred type of packing, and one which has given exceedingly satisfactory service, is the use of V-shaped packing as shown with the upper rings of packing having the V turned down and the lower rings having the V turned upward. Between these V-shaped packings is inserted a liquid packing compound preferably consisting of shredded "Teflon" mixed with a plug valve grease. A packing passage 64 is provided in stuffing box 38 communicating the packing area with the exterior of the box. To provide means whereby additional liquid packing may be inserted into the stuffing box as required, a packing loader 66 is provided, the interior of which communicates with packing 60 by way of packing passage 64. A small packing check valve 68 may be formed within packing loader 66 to preclude liquid packing from being forced out of the stuffing box when the interior of packing loader 66 is exposed to atmospheric pressure. A loader screw 70 is threadably positioned in packing loader 66. When it is desired to add new packing to the stuffing box, loader screw 70 may be removed and the interior of packing loader 66 filled with a liquid packing. After the packing loader has been filled with new liquid packing, loader screw 70 may be screwed inwardly, forcing the liquid packing past check valve 68 and through passage 64 into the stuffing box packing 60.

Piston cylinder 42 is filled with a hydraulic fluid. Piston 58 may be formed of any of a multiplicity of arrangements producing a close but slideable fit between the piston 58 and the interior of the piston cylinder 42. Piston 58 is free to move within cylinder 42 but fits close enough to substantially preclude slippage of fluid contained within the cylinder from passing past the piston.

Clapper 24 is controlled by the hydraulic effect of piston 58 in cylinder 42. To effectively control the action of piston 58, and thereby the valve clapper 24, fluid control means are provided, generally indicated by the numeral 71. Fluid passages communicating with the interior of piston cylinder 42 are provided in both the lower cylinder flange 40A and the upper cylinder flange 40B. A short nipple 74A threadably engages the opening 72A in flange 40A and likewise a nipple 74B threadably engages the opening 72B in flange 40B. Secured to nipples 74A and 74B are lower T 76A and upper T 76B.

Control of the clapper 24 of valve 10 in this invention is effected by controlling the flow of hydraulic fluid within cylinder 42 above and below piston 58 by an arrangement of valves and piping making up the fluid control means 71, best shown in FIGURE 1. Communicating with lower T 76A is an opening control valve 78 at one side of the T and the other side of the T communicates with a closing control valve 80. For simplicity of connections, valves 78 and 80 may be angle valves as shown. Communicating with opening control valve 78 is a check valve 82 which, as indicated by the arrow, permits fluid to flow only in the downward path through opening control valve 78 as occurs when piston 58 is moved upwardly by the opening of clapper 24. Conversely, communicating with closing control valve 80 is a closing control check valve 84 which, as indicated by the arrow, permits fluid to flow only upwardly out of closing control valve 80 as occurs when piston 58 is moved downwardly by the closure of valve clapper 24. Valves 82 and 84 communicate with upper T 76B by pipes 86A and 86B, L's 88A and 88B and, to facilitate assembly, unions 90A and 90B.

Supported to upper cylinder flange 40B is cylinder cover 92, which has a threaded opening 94 formed therein. Theadably supported in opening 94 is a T 96 and supported to one opening of T 96 is a hydraulic accumulator 98. Communicating with the other opening of T 96 is a pressure indicating gage 100.

Hydraulic accumulator 98 is typically of a type commerically available which includes a flexible bag 102 which divides the accumulator 98 into two portions. The portion interior of the bag is adaptable to receive a gas pressure, indicated by the numeral 104. The interior of the hydraulic accumulator exterior of bag 102 is adaptable to receive a hydraulic fluid and is indicated generally by the numeral 106. Communicating with the interior of bag 102 of hydraulic accumulator 98 is a T 108 having one portion of the T communicating with a bleeder valve 110 and the other outlet of T 108 communicating, by piping 112 and charge valve 114, with the interior of crosshead cylinder 34. Crosshead 54 is designed only to slideably align the lower end of piston rod 56 and does not in any way seal the pressure from the interior of valve 10 from the interior of crosshead cylinder 34 so that by opening charge valve 114 the pressure of the interior of valve 10 is applicable by piping 112 to the interior 104 of bag 102 of the hydraulic accumulator 98.

Operation

Valve 10 is shown in FIGURE 2 in the closed position with clapper 24 in contact with valve face 32. When pressure to the right of valve clapper 24 exceeds that to the left within valve 10, force will be exerted to open clapper 24. In the normal valve the only restraint applied to this opening force is the weight of the clapper itself. In the arrangement of this invention the movement of clapper 24 is transferred by connecting rod 48 and piston rod 56 to piston 58. Piston cylinder 42 is filled with hydraulic fluid which also fills all of the fluid control means 71 and the portion within hydraulic accumulator 98 exterior of bag 102 indicated by the numeral 106. As piston 58 moves upwardly, fluid within the cylinder 42 above piston 58 flows through opening 72B in the cylinder flange, through nipple 74B, through T 76B, through L 88A, pipe 86A, union 90A, check valve 82, open control valve 78, T 76A, nipple 74A and lower opening 72A back into the confines of piston cylinder 42 below piston 58. It will be noted that fluid, as piston 58 moves upward, cannot flow through closed control valve 80 since it is precluded by closing control check valve 84. Thus, the rate of upward movement of piston 58, and thereby clapper 24, is limited by the rate of flow of fluid through the open control valve 78. If a slower rate of opening is desired, open control valve 78 is adjusted to increase the restriction of fluid flow therethrough which in turn decreases the rate of travel of piston 58. Conversely, if a more rapid opening of clapper 24 is desired, then open control valve 78 is adjusted to permit greater fluid flow.

When pressure within valve 10 to the left of clapper 24 is greater than that to the right, flow through valve fluid port 29 will be applied to close clapper 24. This requires piston 58 to move downwardly which forces fluid from the bottom of piston 58 through closing control valve 80 and back into piston cylinder 42 above piston 58. Flow of fluid is routed through closing control valve 80 since closing control check valve 84 is oriented to permit flow therethrough whereas opening control check valve 82 is oriented to prevent flow therethrough. As previously described with reference to the opening of clapper 24 and the manner in which opening control valve 78 controls the rate of opening, the closing control valve 80 controls the rate at which clapper 24 will close.

It can be seen that the invention can be simplified by the provision of only one control valve 78 and the elimination of the check valves 82 and 84 so that fluid flows the same route in both the opening and closing movements of piston 58. Such an arrangement works completely satisfactory except, unlike the bidirection flow arrangement shown, it does not permit individual adjustment of opening and closing rates. The provision of a single control valve 78 is of course within the purview of the invention. In a still more basic embodiment of the invention, all of the external piping including valves 78 and 80 may be eliminated and the fluid control means 71 may consist of the flow of hydraulic fluid past piston 58 as it moves in cylinder 42. Such an arrangement, although functionable, presents difficulty in adjustment of the opening and closing rates.

In ordinary practice, it is normally desirable that the valve 10 open fairly readily to preclude exerting undue pressure on the pumps and so forth, but that it close more slowly to eliminate shock caused by sudden reversal of pressure. For this reason it is desirable that individual control, as shown, be provided for the opening and closing operations.

Accumulator 98 is provided for two reasons. First, the amount of hydraulic oil displaced above the piston 58 as the piston 58 moves upwardly within piston cylinder 42 is greater than is the resulting volume increase below piston 58 within piston cylinder 42 because of the area displaced by piston rod 56. This increased hydraulic fluid is absorbed within the hydraulic accumulator 98, the increased pressure being adjusted by compression of gas 104 and the resultant reduction in the area of bag 102. The provision of hydraulic fluid 106 in hydraulic accumulator 98 serves more or less as a fluid reserve and as a fluid compensator for the differences in quantity of fluid contained within cylinder 42 according to the position of piston 58.

In addition to the above function of hydraulic accumulator 98, it also functions to equalize the force exerted on piston rod 56 by the pressure within valve 10. Force within valve 10, and therefore within the crosshead cylinder 34, will exert an upward pressure against piston rod 56 equal to the pressure in pounds per square inch times the cross-sectional area of piston rod 56 in square inches. This would tend to push piston rod 56 upwardly and therefore raise clapper 24. To compensate for this upward force, pressure is maintained by gas 104 in bag 102 of the hydraulic accumulator 98. Preferably this pressure is equal to the pressure within valve 10. The pressure within bag 102 is transferred to hydraulic fluid 106 and this hydraulic pressure is transferred as a downward pressure on piston rod 56. Therefore, if the pressure of gas 104 in the hydraulic accumulator 98 is equal to the pressure in valve 10, the forces against piston rod 56 will be balanced and the clapper 24 will open and close according to changes due to fluid flow in valve fluid port 29.

Gas 104 may be inserted directly into hydraulic accumulator 98 from any pressure source or, as shown in this invention, hydraulic accumulator 98 may be charged directly by means of charge valve 114 and piping 112 with the gas pressure taken directly from within crosshead cylinder 34. The hydraulic accumulator 98 may be charged by opening charge valve 114 which may then be closed so that, except for any leakage which may occur, the charge in the hydraulic accumulator remains the same. Or, charge valve 114 may at all times be left open so that regardless of pressure changes within valve 10 the closure control system will remain in a balanced condition as any changes which occur in the pressure in valve 10 will automatically change the pressure in hydraulic accumulator 98.

For certain engineering reasons it may be desirable that valve 10 be biased to the open or closed position. As an example, it may be desirable to utilize valve 10 to exert a back pressure in addition to serving as check valve. If this is desirable, then hydraulic accumulator 98 may be charged to a pressure greater than that which will occur within the valve 10. This will then exert always a downward force tending to close clapper 24 which must be overcome before it will open. In the alternative, although a less frequently useable application, by charging hydraulic accumulator 98 with a pressure less than is contained within valve 10 the valve would be biased in an open position and would be forced closed only by a greater flow of fluid through the valve than would normally be required. To facilitate control of the pressure of gas 104 in hydraulic accumulator 98, bleeder valve 110 is provided whereby the pressure may be reduced by opening it. A gage 100 is connected directly to the hydraulic system to visually indicate the pressure at all times exerted by hydraulic accumulator 98 as a ready reference as to whether any leakage has occurred.

In this description the expression "fluid" has been used as describing the material which would normally be expected to flow through valve 10. By fluid is included both gases and liquids. However, slamming of check valves is most difficult with gases due to the expansive nature of gas and the application of this invention will find most frequent use in relation to gases. If liquid is the fluid flowing through valve 10, then of course hydraulic accumulator 98 could not be charged with charge valve 114 but would be charged by some external source of gas pressure.

The hydraulic accumulator 98 including the expansible bag 102 is utilized by way of example only as a commercially available means of providing a pressure maintaining and absorbing system in conjunction with the hydraulic system of this invention, it being understood that any other type of hydraulic accumulating and pressure maintaining device or system would function equally as well. The piping utilized to conduct fluid flow caused by the movement of piston 58 is shown by way of example to include readily available valves and pipe fitting components and is likewise by way of example only as a multitude of other arrangements are obviously available to control and restrict fluid flow caused by the movement of piston 58.

This invention provides a means of controlling the action of check valves to prevent their sudden opening and closing which, as previously mentioned, results in great damage to the valve itself and to piping, pumping and manifolding equipment used in industrial applications. The invention has solved a long need in the industry in a manner utilizing components readily available.

Although this invention has been set forth in a certain degree of particularity, it is manifested that many changes may be made in the details of construction and the arrangement of components without departing from the spirit and scope of this disclosure.

What is claimed:
1. A controlled action check valve comprising, in combination:
    a valve body having a fluid passageway therethrough;
    a clapper pivotally supported in said valve body adaptable to close said fluid passageway when pivoted in one direction and to open said fluid passageway to substantially the full area thereof when pivoted in the opposite direction;
    a piston rod;
    means connecting said piston rod to said clapper, said piston rod being axially displaced as said clapper opens and closes;
    a cylinder supported to said valve body externally of said fluid passageway having one end of said piston rod terminating therein;
    a stuffing box interposed between said cylinder and valve body, said stuffing box slidably and sealably receiving said piston rod;
    a piston slidably positioned in said cylinder, said piston affixed to said piston rod at the end thereof within the cylinder, said cylinder being filled with a hydraulic fluid;
    fluid flow control means communicating with the interior of said cylinder adjacent each end thereof whereby the rate of flow of fluid displaced by the movement of said piston in said cylinder is controlled;
    a pressure compensating tank supported externally of said cylinder and having fluid communication with the interior of said cylinder;
    a flexible gas-filled bag within said pressure compensating tank;
    an external pressure filling and emptying means in said tank providing communication with said gas-filled bag;

conduit means between said external pressure filling and emptying means of said tank and the interior of said valve; and an externally controllable valve means in said conduit means.

2. A controlled action check valve comprising, in combination:

a valve body having a fluid passageway therethrough;

a clapper pivotally supported by and within said valve body, said clapper pivotable in one direction by fluid flow to open said valve passageway to substantially the full area thereof and pivotable in the opposite direction by fluid flow to close said fluid passageway;

a crosshead cylinder supported at one end thereof to said valve body externally of said fluid passageway, said crosshead cylinder having communication at the supported end with the interior of said valve body;

a crosshead slidably positioned in said crosshead cylinder;

a stuffing box at the end of said crosshead cylinder opposite said end supported to said valve body, said stuffing box having a sealable opening therein;

a piston cylinder supported at one end to said stuffing box, said piston cylinder supported coaxially of said opening in said stuffing box and of said crosshead cylinder, said piston cylinder having hydraulic fluid therein;

a piston slidably positioned in said piston cylinder;

a piston rod slidably and sealably positioned in said opening of said stuffing box, said piston rod connected at one end to said piston and at the other end to said crosshead;

a connecting rod pivotably supported at one end to said crosshead and at the other end to said clapper;

fluid flow control means communicating with the interior of said piston cylinder adjacent each end thereof whereby the rate of flow of fluid displaced by the movement of said piston in said piston cylinder is controlled;

a pressure compensating tank having fluid communication with said piston cylinder;

a flexible gas-filled bag in said tank;

external pressure filling and emptying means in said pressure tank in communication with said gas-filled bag;

a conduit means between said gas-filled bag and the interior of said valve body; and a valve means in said conduit means.

References Cited by the Examiner
UNITED STATES PATENTS

| | | | |
|---|---|---|---|
| 353,995 | 12/86 | Walker | 137—527 XR |
| 1,487,038 | 3/24 | Spencer | 137—514 XR |
| 1,886,712 | 11/32 | Messier. | |
| 2,810,571 | 10/57 | Ferguson | 188—88.51 XR |
| 2,838,140 | 6/58 | Rasmusson | 188—97.1 |
| 2,888,950 | 6/59 | Wheatley | 137—514 |
| 3,098,502 | 7/63 | Deve | 137—514 |

M. CARY NELSON, *Primary Examiner.*

MARTIN P. SCHWARDRON, *Examiner.*